United States Patent
Radhakrishna et al.

(10) Patent No.: US 10,558,372 B1
(45) Date of Patent: Feb. 11, 2020

(54) METHOD AND SYSTEM FOR IMPLEMENTING ACTION APPLICATION PROGRAMMING INTERFACE (API) FRAMEWORK

(71) Applicant: EMC Corporation, Hopkinton, MA (US)

(72) Inventors: Goutham Radhakrishna, San Jose, CA (US); Paul Popelka, Cupertino, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 343 days.

(21) Appl. No.: 14/867,995

(22) Filed: Sep. 28, 2015

(51) Int. Cl.
*G06F 3/06* (2006.01)

(52) U.S. Cl.
CPC ............ *G06F 3/0619* (2013.01); *G06F 3/065* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 2003/0028736 A1* | 2/2003 | Berkowitz | .......... | G06F 11/1451 711/162 |
| 2007/0240112 A1* | 10/2007 | Haselden | ............... | G06Q 10/10 717/121 |
| 2008/0243769 A1* | 10/2008 | Arbour | ............... | G06F 11/1453 |
| 2010/0268568 A1* | 10/2010 | Ochs | ................... | G06Q 10/0633 705/7.27 |
| 2010/0306005 A1* | 12/2010 | Yengulalp | ............... | G06Q 10/06 705/7.27 |
| 2013/0253977 A1* | 9/2013 | Vibhor | ............. | G06Q 10/06316 705/7.26 |
| 2013/0346617 A1* | 12/2013 | Hotes | ................... | H04L 41/0806 709/226 |
| 2014/0181438 A1* | 6/2014 | Varadharajan | ........ | G06F 3/0619 711/162 |

* cited by examiner

*Primary Examiner* — Tuan C Dao
*Assistant Examiner* — William C Wood
(74) *Attorney, Agent, or Firm* — Womble Bond Dickinson (US) LLP (57) ABSTRACT

Methods and systems for implementing an Action application programming interface (API) framework are described herein. A method of implementing an API framework starts by generating input work items from an external source for a first action included in a workflow. The external source includes a list of client devices to be backed up. The output work items for the first action are then populated when the first action is complete. The input work items for a second action included in the workflow are retrieved using the output work items for the first action. The input work items for the second action are filtered using a filter and the output work items for the second action are populated when the second action is complete.

19 Claims, 5 Drawing Sheets

METHOD AND SYSTEM FOR IMPLEMENTING ACTION APPLICATION PROGRAMMING INTERFACE (API) FRAMEWORK

FIELD OF THE INVENTION

Embodiments of the present invention relate generally to data storage systems. More particularly, embodiments of the invention relate to implementing an Action Application Programming Interface (API) framework that provides for filtering mechanisms.

BACKGROUND

The ability to backup data and restore lost data is an important function of modern computer systems. Many companies and individuals with large amounts of stored data employ a file system as a data storage system. These data storage systems can be located local to the data to be backed up or at a remote site. The data storage systems can be managed by the entity controlling the data storage devices or a data storage service company. Data can be added to the storage system at any frequency and at any amount.

Data storage systems may offer storage for backup and disaster recovery. Transfer to remote storage may require the transfer of data over a network. A local client data backup application prepares and sends data from the local file system to a backup system. The backup system stores the data received from the local client application to be utilized in the event of a corruption or failure at the computing device executing the local client data backup application.

However, the implementation of backup and restore functions is complex. Data storage systems are expected to handle multiple workflows, which are chains of actions including backup actions and clone actions that are scheduled to be run. Current backup solutions fail to support the filtering of work items passed between the actions in a workflow.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

As discussed herein above, data backup and data backup systems are designed to store a copy of a set of data storage systems in case of disaster recovery (DR) or similar scenarios. DR is a process of preparing for recovery or continued operation of technology infrastructure critical to an organization after a disaster that renders a computer inoperable or corrupts the data on the physical disk. One of the critical aspects of DR planning is timely recovery of data and processes following the incident. Organizations develop recovery strategies to ensure that the system downtime is minimal at best, within acceptable limits/threshold and predictable. For reducing outage time, the system should be recovered quickly and effectively following disruption. Currently, time to recover depends on the type of data and the size of critical data.

In backup systems, the backed up data is stored as a set of snapshots of the data storage system that are captured over time. Snapshots are also known as a shadow copy or a point-in-time copy. This is in contrast to 'standard' backup processes that makes a duplicate and compresses the data on the data storage system into another format on the backup system. Snapshot based backup can provide a backup with less downtime or disruption to the data storage system and that can provide a fast data recovery process. There are several types of storage snapshot systems including copy-on-write and split-mirror snapshot systems. The capacity to generate these snapshots is included in many data backup clients.

A copy-on-write snapshot creation process generates a snapshot of changes to stored data every time new data is stored or existing data is modified on the data storage system. Thus, the backup data is always up to date enabling immediate recovery of data in its most recent form in case of a failure. However, all previous snapshots from the point of failure to the last full snapshot image of the data storage system must be available for recovery.

A split-mirror snapshot process references all the data on a set of mirrored drives. Each time the process is executed, a snapshot is created of the entire volume, rather than just the changes to the volume. Having complete snapshots simplifies the process of recovering, duplicating, or archiving all the data on a drive. However, this is a slower process, and it requires more storage space for each snapshot and changes made since the last snapshot are lost.

In some embodiments, the snapshots are generated by leveraging the snapshot capabilities of either data storage system hardware/Array based capabilities (e.g., the Symmetrix or similar backup software programs) or related software based capabilities (e.g., capabilities virtualization or volume management software or similar data storage system related software). The Symmetrix system is a system of EMC® Corporation of Hopkinton, Mass. A system for snapshot backups can have the following major components:

(1) a source/production host: this is the host data storage system where the production data is hosted (i.e., the data to be backed up);

(2) a source logical unit number (LUN): the source host has the production data provisioned to the source LUN (i.e., the production data is stored in a source LUN), e.g., a production host can have source LUNs coming from Symmetrix or similar data storage systems;

(3) a mount host/data mover/proxy: these are different names for the same component, this is the host system where the backup snapshots are mounted;

(4) target LUN: the mount host has the storage of the backup snapshots provisioned to the target LUN, e.g., the mount host has target LUNs coming from Symmetrix or similar data storage systems; and (5) backup server: the backup server includes a policy engine (amongst other components, which manages the backup process. Though the snapshots are handled at the data storage array or software level (dependent on the production host), the metadata information related to the snapshot backup process goes to a backup server catalog managed by the backup server; and (6) zoning: a logical grouping of data storage arrays using a set of switches, both source and mount hosts are zoned properly to associated data storage arrays using respective sets of switches.

Disadvantages of the prior art include that the current backup solutions fail to support the filtering of work items passed between the actions in a workflow.

Figure 1:
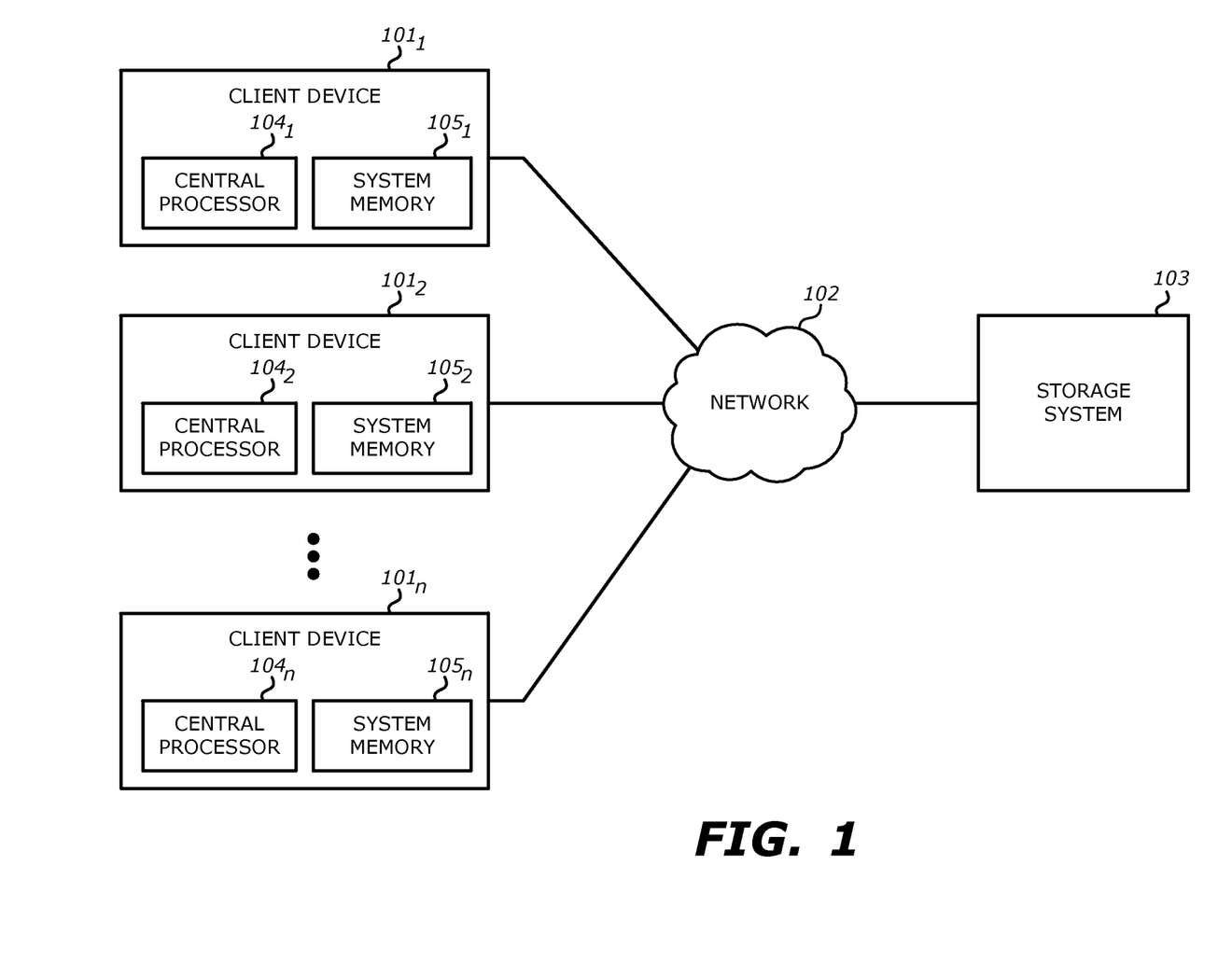
FIG. 1 is a block diagram illustrating an environment for implementing embodiments of the invention.

FIG. 1 is a block diagram illustrating an environment for implementing embodiments of the invention. The environment in FIG. 1 includes one or more client devices $101_1$-$101_n$ (n>1) communicatively coupled to storage system 103 over network 102. Client devices $101_1$-$101_n$ may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of client devices $101_1$-$101_n$ may be a primary storage system that provides storage to other local clients, which may periodically back up the content stored therein to the backup and restore system 103. Each of the client devices $101_1$-$101_n$ may respectively include a central processor $104_1$-$104_n$ and a system memory $105_1$-$105_n$. Each of the central processors $104_1$-$104_n$ may include multiple processors or a multicore processor, which may permit parallel processing of information. Each system memory $105_1$-$105_n$ may have stored therein instructions that may be executed by the central processor $104_1$-$104_n$, respectively, to cause the central processor $104_1$-$104_n$, to control its client device $101_1$-$101_n$. For instance, the system memory $105_1$ may have stored therein instructions, which when executed by the central processor $104_1$, causes the system processor $104_1$ to run an operating system for the client device $101_1$. The memory device $105_1$ may include a machine (e.g., a computer) readable storage medium (e.g., read only memory ("ROM"), random access memory ("RAM"), magnetic disk storage media, optical storage media, flash memory devices).

Network 102 may be any type of networks such as a local area network (LAN), a wide area network (WAN) such as the Internet, a fiber network, a storage area network (SAN), or a combination thereof, wired or wireless. Client devices $101_1$-$101_n$ may be in physical proximity or may be physically remote from one another. Storage system 103 may be located in proximity to one or neither of clients $101_1$-$101_n$.

Figure 2:
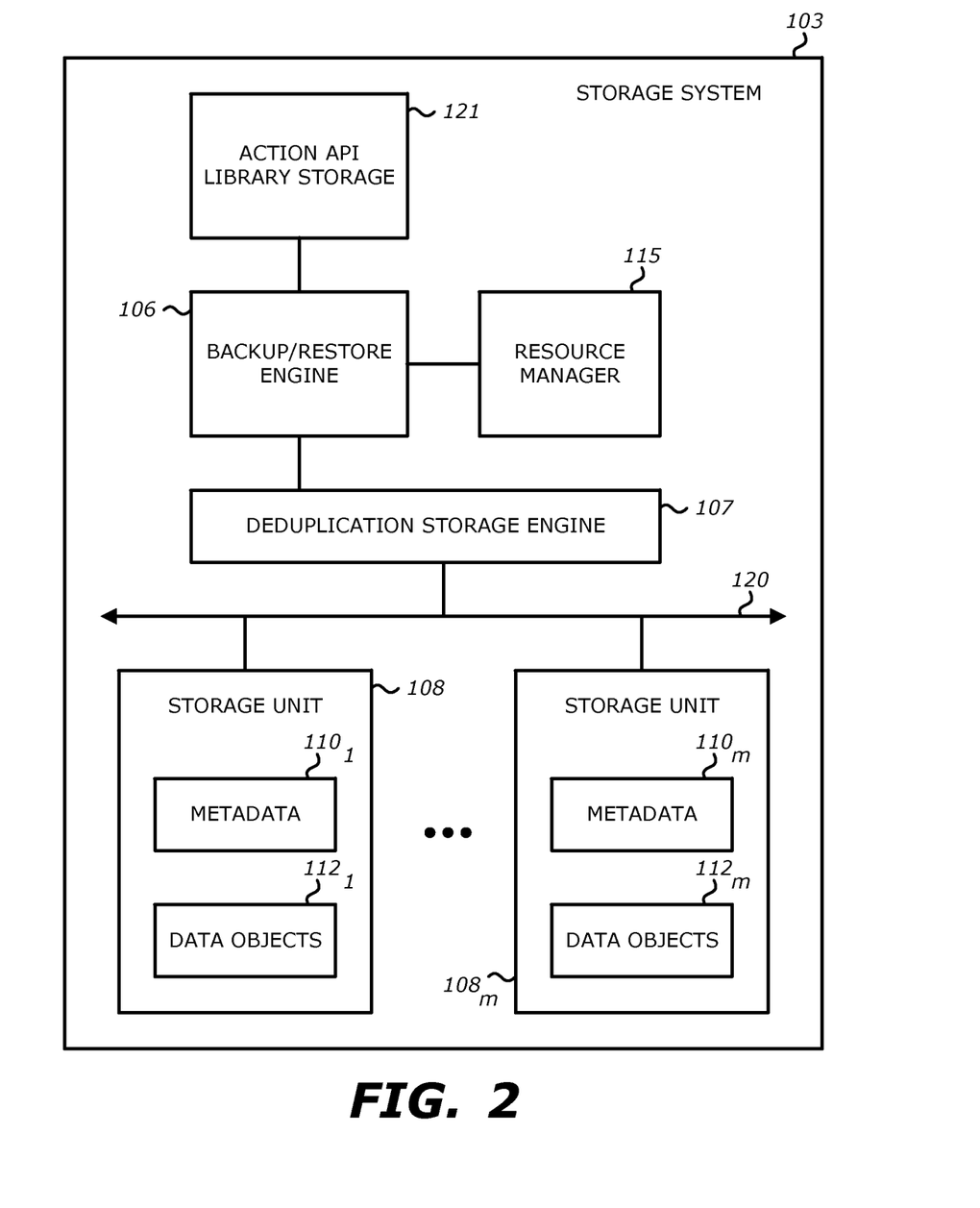
FIG. 2 is a block diagram illustrating a system for implementing an Action application programming interface (API) framework according to one embodiment of the invention.

FIG. 2 is a block diagram illustrating a storage system 103 to according to implement an Action API framework according to one embodiment of the invention. Storage system 103 may include any type of server or cluster of servers. For example, storage system 103 may be a storage server used for any of various different purposes, such as to provide multiple users with access to shared data and/or to back up mission critical data. Storage system 103 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 103 may have a distributed architecture, or all of its components may be integrated into a single unit. Storage system 103 may be implemented as part of an archive and/or backup system such as a deduplicating storage system available from EMC® Corporation of Hopkinton, Mass.

In one embodiment, storage system 103 includes, but is not limited to, backup/restore engine 106, deduplication storage engine 107, and one or more storage units $108_1$-$108_m$ (m>1) communicatively coupled to each other. Storage units $108_1$-$108_m$ may be implemented locally (e.g., single node operating environment) or remotely (e.g., multi-node operating environment) via interconnect 120, which may be a bus and/or a network. In one embodiment, one of the storage units $108_1$-$108_m$ operates as an active storage to receive and store external or fresh user data, while the other storage unit operates as a target storage unit to periodically archive data from the active storage unit according to an archiving policy or scheme. Storage units $108_1$-$108_m$ may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units $108_1$-$108_m$ may also be a combination of such devices. In the case of disk storage media, the storage units $108_1$-$108_m$ may be organized into one or more volumes of Redundant Array of Inexpensive Disks (RAID).

In response to a data file to be stored in storage units $108_1$-$108_m$, deduplication storage engine 107 is configured to segment the data file into multiple chunks according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units $108_1$-$108_m$ or across at least some of storage units $108_1$-$108_m$. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata $110_1$-$110_m$, may be stored in at least some of storage units $108_1$-$108_m$, such that files can be accessed independent of another storage unit. Metadata of each storage unit includes enough information to provide access to the files it contains. In one embodiment, metadata may include fingerprints contained within data objects $112_1$-$112_m$, where a data object may represent a data chunk, a compression region (CR) of data chunks, or a container of one or more CRs. Fingerprints are mapped to a particular data object via metadata $110_1$-$110_m$, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, the storage system 103 as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

According to one embodiment, backup/restore engine 106 is responsible for backing up data from remote clients (e.g., clients $101_1$-$101_n$) to one or more local storage units (e.g., storage units $108_1$-$108_m$). Backup/restore engine 106 is also responsible for restoring data from one or more local storage units to the remote clients. Backup/restore engine 106 may also be configured to perform any other services, including, for example, data replication, migration, etc. Typically, a service (whether it be a backup, replication, migration, etc.) requires resources (e.g., streams, etc.). Storage system 103 cannot grant a service to clients $101_1$-$101_n$ unless the required resources are available. In one embodiment, storage system 103 includes resource manager 115 for managing resources and performing operations that allow resources to be fairly distributed among clients $101_1$-$101_n$.

As shown in FIG. 2, storage system 103 also includes an Action API storage 121 that is coupled to the backup/restore engine 106. The Action API storage 121 stores an Action API library. Table 1 includes exemplary Action framework APIs:

TABLE 1

Action Framework APIs

| API call | Description |
| --- | --- |
| action_init( ) | Initialize the action framework and allocate memory for the resources |
| action_deinit( ) | De-initialize the action framework and free all the allocated resources |
| action_get_all_available_input_work_items( ) | Retrieve all the available input work items for an action |
| action_get_next_input_work_item( ) | Get the next available input work item for an action |
| action_set_work_item_status( ) | Set the work item status to running, successful, failed, cancelled or filtered |
| action_put_output_work_item( ) | Populate the output work item for this action. This may later be used to populate the input work items for the next action in the workflow chain |
| action_set_job_completion_status( ) | Set the completion status of the action |
| action_get_details( ) | Retrieves action details like policy name, workflow name, and action name |
| action_get_properties( ) | Get action specific properties like retention, storage node, destination pool, etc, as well as action properties like "filter rules" which can be applied on the input work items. |

When executed by the backup/restore engine 106, the Action API library provides a mechanism for passing work items from an action (or task or process) to another action (or task or process) in a workflow. A workflow is a chain of actions that are scheduled to be run. There may be multiple chains of actions which may be scheduled to run concurrently. Actions may include backup actions and clone actions. As shown in Table 1, the Action API library also provides for monitoring status and progress of actions in the workflow. The Action API library is also configured to override work items with new work items for an adhoc run.

Figure 4A:
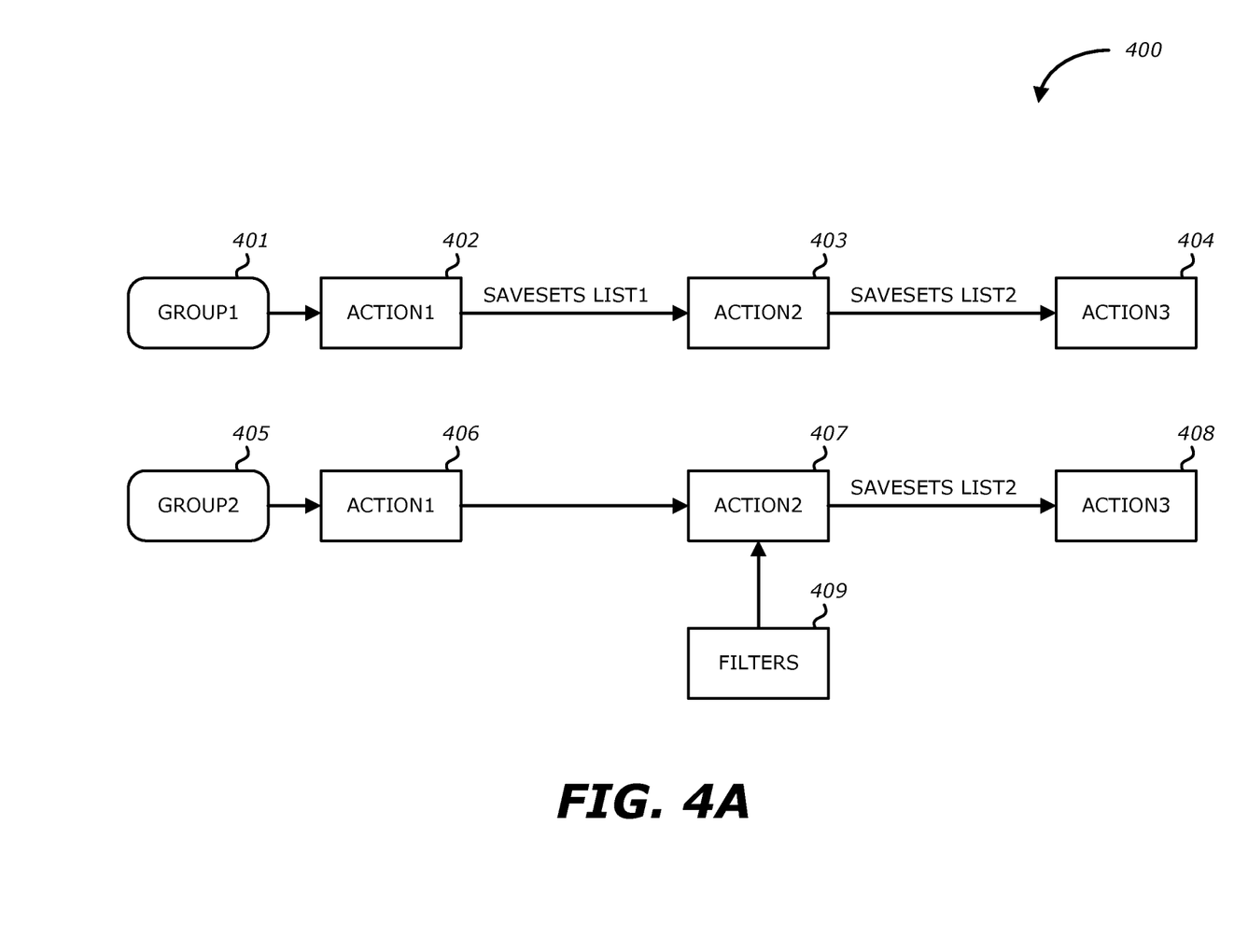
FIGS. 4A-B are block diagrams illustrating the work item flows according to embodiments of the invention.
Figure 4B:
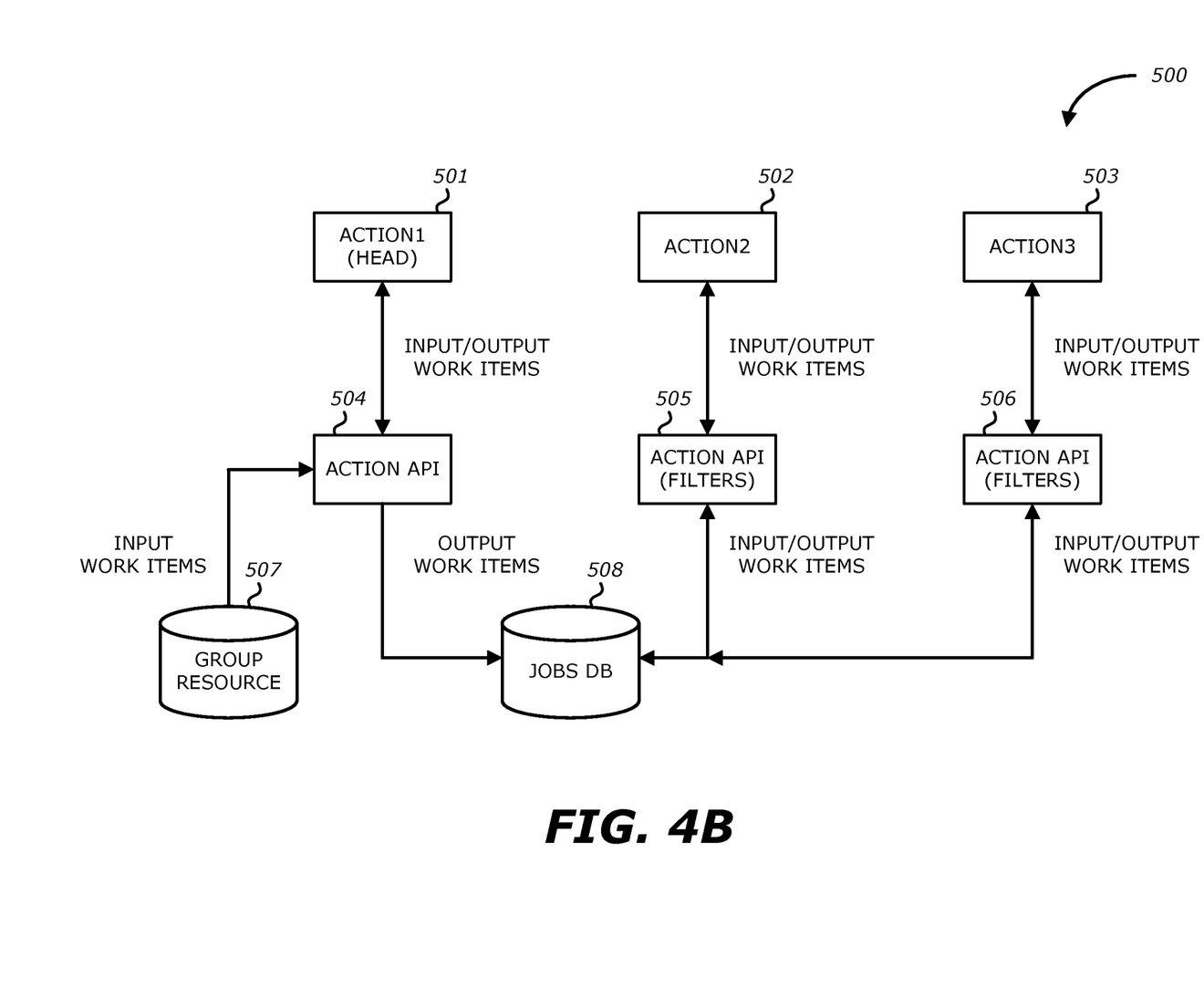

FIGS. 4A-B are block diagrams illustrating the work item flows 400, 500 according to embodiments of the invention. Specifically, FIG. 4A illustrates the work item flow 400 between actions with Action API library built as part of the action itself while FIG. 4B illustrates work item flow 500 between actions using the Action API framework (e.g., Action API 504, 505, 506). As shown in FIGS. 4A-B, the first action (e.g., head action1 402, 406, 501) in the chain of the workflow gets work item inputs from the external device (e.g., group1 401, group2 405, group resource 507). The group is a list of the clients (or hosts) $101_1$-$101_n$ that need to be backed up. The Action API library generates input work items from an external source for the first action by accessing the group resource 507, expanding the group resource 507, and obtains the input work items. The Action API library then provides the input work items to the first action. In one embodiment, the Action API library is configured to establish an interface to generate new work items from an external source (e.g., Groups in EMC® Corporation's NetWorker™). Once the first action is complete, the Action API library generates a set of output work items, and thus, populating output work items for the first action. The Action API library then retrieves (or fetch) input work items for a second action (e.g., action2 403, 407, 502) included in the workflow using the output work items for the first action (e.g., action1 402, 406, 501). As shown in FIG. 4B, the Action API 504 may generate the output work items for the first action (e.g., action1 501) and store the output work items in the group library (e.g., Jobs database (DB) 508). Similarly, Action API 505 and 506 may obtain input work items from the jobs DB 508 and generate output work items to the jobs DB 508. In one embodiment, the Action API storage 121 in FIG. 2 may store the group resource 507 and the jobs database 508 in FIG. 4B.

In some embodiments, the second action (e.g., action2 403, 407, 502) is a clone action that obtains work item inputs from the output of the first action (e.g., action1 402, 406, 501). The second action (e.g., action2 403, 407, 502) may transmit an API call to the Action API library to get the next available input work item or to retrieve all the available input work items. The Action API library thus retrieves input work items for a second action (e.g., action2 403, 407, 502) included in the workflow using the output work items for the first action (e.g., action1 402, 406, 501). In one embodiment, the first action (e.g., action1 402, 406, 501) may still be running while the second action (e.g., action2 403, 407, 502) makes the API call to get the next available input work item or to retrieve all the available input work items from the first action (e.g., action1 402, 406, 501) output.

In one embodiment, Action API library includes filtering mechanisms that apply filters based on given rules. As shown in FIGS. 4A-B, the second action (e.g., action2 403, 407, 502) may apply filters 409 (or in Action API 505-506). The third action (e.g., action3 503) in FIG. 4B via the Action API 506 may also apply at least one filter. The filter 409 (or in Action API 505-506) may be based on, for example, a client list, a list of backup levels, a save set type, or a time range.

When the filter is based on a client list, the filter includes or excludes clients on the client list from the input work items for the second action (e.g., action2 403, 407, 502). For example, the list of clients may be a list of the client devices 101$_1$-101$_m$ that are in a "protection group" which need to be included, or a list of the clients devices 101$_1$-101$_m$ that are "unimportant" or that have "a large dataset" that are to be excluded. The list of clients may also be a list of Network-Attached Storage (NAS) devices or clients that are not interested in cloning such that the NAS devices or clients on the list of clients are to be excluded by the filter.

When the filter based on a list of backup levels, the filter includes or excludes backup levels on the list of backup levels from the input work items for the second action (e.g., action2 403, 407, 502). For example, in some situations, every backup is a level "synthesized in full." When cloning to tape, cloning all these backups will cause the tapes to fill quickly. Accordingly, for this long-term retention scenario, the filter may only include level "fulls" and exclude the level "incrementals". In a similar scenario for the Network Data Management Protocol (NDMP) and NAS which have backups which are very large and include "incrementals," the filter may include only the level "weekly fulls" to be cloned in order to reduce the network bandwidth and target space usage.

When the filter is based on a save set type, the filter includes input work items of the save set type for the second action. The save set type may be, for instance, snapshots, protect point based save sets, etc. In one example, a first action may be a backup action that produces a mix of snapshot and non-snapshot save sets. The filter may be applied to filter out (e.g., exclude) the non-snapshot save sets and pass only the snapshot save sets to be cloned in the second action. In prior art systems, when cloning some DB backups (e.g., EMC® Corporation's ProtectPoint™ database (DB) backups), part of the database data is backed up using ProtectPoint™ and part is backed up using other means. Accordingly, the replication of the backup from a local disk drive (DD) to a remote DD using a cloning action is problematic given then current inability to separate the DB backups based on the save set types. As such, all of the save sets currently being sent as input to the second action to be cloned. More specifically, in current prior art systems, if the target of the clone action is a ProtectPoint™ device, the ProtectPoint™ save sets will be replicated to the remote DD and all other save sets will be skipped. Meanwhile, if the target of the clone action is not a ProtectPoint™ device, then the ProtectPoint™ save sets as well as the other type save sets will be mounted and cloned to media. The current prior art systems do not allow for a ProtectPoint™ DB backup to be cloned so that all the save sets are replicated to a remote DD. Accordingly, in one embodiment, the filter that is based on a save set type may filter in (e.g., include) a type of save set (e.g., the ProtectPoint DB backups) to be cloned in the second action.

When the filter is based on a time range, the filter includes input work items within the time range for the second action. For example, if the snapshot backups are taken 6 times a day and it is desired to clone one single snapshot backup a day to media for long term retention, the first action may be a backup action followed by the second action with may be a clone action. The clone action in this example may be filtered using a time range such that only the desired single snapshot backup is cloned.

The Action API library is configured retrieve input work items for a third action (e.g., action3 404, 408) included in the workflow using the output work items for the second actions (e.g., action2 403, 407). As shown in FIG. 4A, the output work items for the second actions (e.g., action2 403, 407) may be save set lists (e.g., save set list2).

Figure 3:
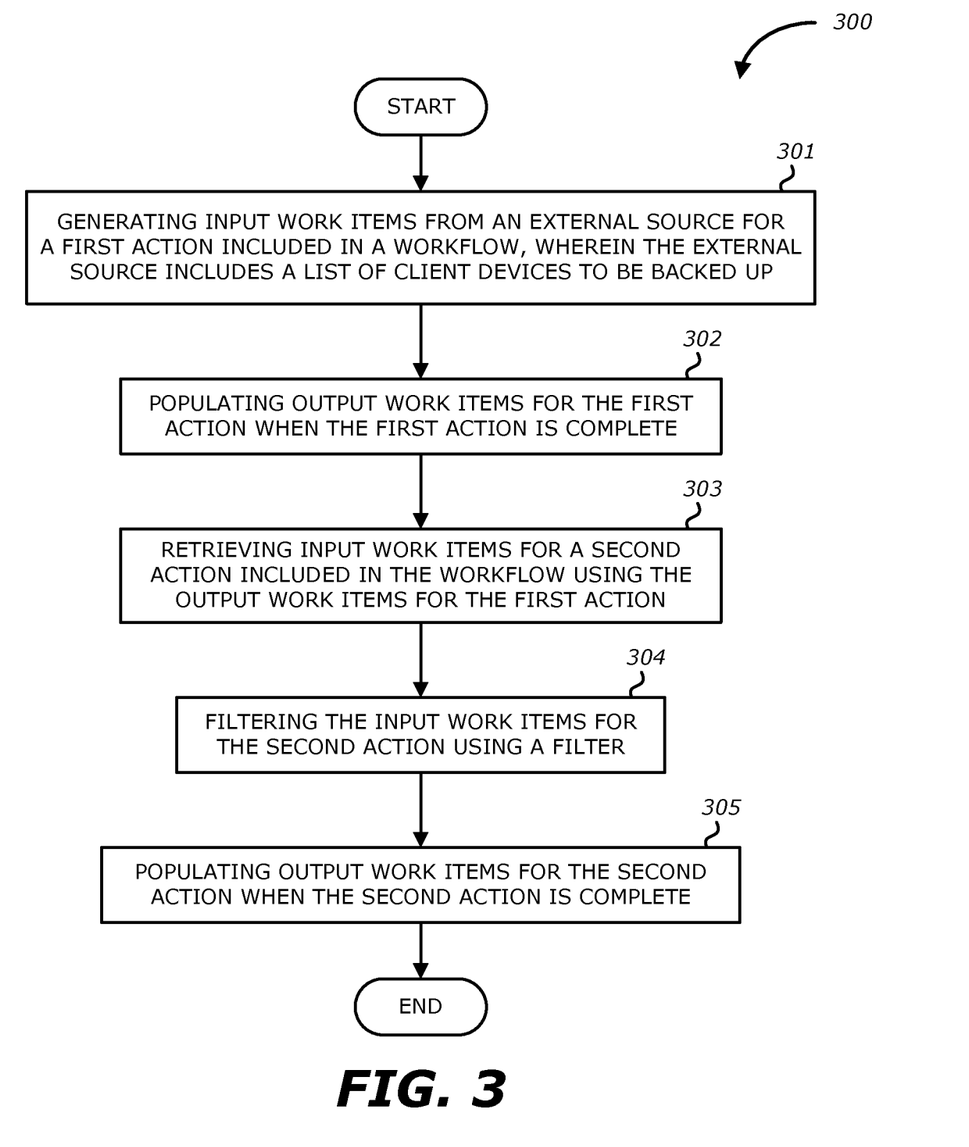
FIG. 3 is a flow diagram illustrating a method of implementing an Action application programming interface (API) framework according to one embodiment of the invention.

FIG. 3 is a flow diagram illustrating a method 300 of implementing an Action API framework according to one embodiment of the invention. In one embodiment, a processor included in the storage system 104 performs the method 300 to implement the Action API framework. In one embodiment, the Action API library storage 121 stores the Action API library and the backup/restore engine 106 executes the Action API library, which causes the backup/restore engine 106 to perform method 300.

As shown in FIG. 3, method 300 starts at Block 301 with the storage system 103 generating input work items from an external source for a first action included in a workflow. The external source includes a list of client devices to be backed up. The external source may a group and the storage system 103 may expand the group and provide the input work items therefrom to the first action. The first action may be a backup action. In one embodiment, the storage system 103 generates the input work items from the external source in response to an API call (e.g., action_get_all_available_input_work_items( ), and action_get_next_input_work_item( )).

At Block 302, the storage system 103 populates output work items for the first action when the first action is complete. In one embodiment, the storage system 103 populates the output work items in response to an API call (e.g., action_put_output_work_item( )). At Block 303, the storage system 103 retrieves input work items for a second action included in the workflow using the output work items for the first action. The second action may be a cloning action. In one embodiment, the storage system 103 retrieves the input work items in response to an API call (e.g., action_get_all_available_input_work_items( ), and action_get_next_input_work_item( )). In one embodiment, the storage system 103 overrides the input work items for the first action or the second action with new work items for an adhoc run.

At Block 304, the storage system 103 filters the input work items for the second action using a filter. In one embodiment, the filter is based on a client list and the filter includes or excludes clients on the client list from the input work items for the second action. In another embodiment, the filter may be based on a list of backup levels and the filter includes or excludes backup levels on the list of backup levels from the input work items for the second action. In one embodiment, the filter is based on a save set type and the filter includes input work items of the save set type for the second action. In one embodiment, the filter is based on a time range and the filter includes input work items within the time range for the second action. In one embodiment, the storage system 103 may filter the input work items in response to an API call to get the filter rules (e.g., action_get_properties( )) which are then applied to the input work items.

At Block 305, the storage system 103 populates output work items for the second action when the second action is complete. In one embodiment, the storage system 103 populates the output work items in response to an API call (e.g., action_put_output_work_item( )).

In one embodiment, the storage system 103 initializes an action framework and allocates memory for resources in response to an initializing API call (e.g., action_init( )) and de-initializes the action framework and free the allocated memory in response to a de-initializing API call (e.g., action_deinit( )).

In response to an status setting API call (e.g., action_set_work_item_status( ), or action_set_job_completion_status ( )), the storage system 103 may also set status of the input work items or the output work items for the first or second action to at least one of: running, successful, failed, cancelled, filtered, or completed. In response to a details request API call (e.g., action_get_details( )), the storage system 103 may retrieve an action detail for the input work items for the first action or the second action. The action detail may include at least one of: policy name, workflow name, or action name. In response to a properties request API call (e.g., action_get_properties( )), the storage system 103 may retrieve an action property for the input work items for the first action or the second action. The action property may include at least one of: retention, storage node, destination pool, and filter rules.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of implementing an Action application programming interface (API) framework comprising:
generating input work items from an external source for a first action included in a workflow, wherein the external source includes a list of client devices to be backed up;
populating output work items for the first action when the first action is complete;
retrieving input work items for a second action included in the workflow using the output work items for the first action;
filtering the input work items for the second action using a filter, wherein when the filter is based on a client list, the filter includes or excludes clients on the client list from the input work items for the second action, when the filter is based on a list of backup levels, the filter includes or excludes backup levels on the list of backup levels from the input work items for the second action, when the filter is based on a save set type, the filter includes input work items of the save set type for the second action, and when the filter is based on a time range, the filter includes input work items within the time range for the second action;
performing the second action using the filtered input work items, wherein the second action is a clone action that:

obtains work item inputs from the output work items for the first action, and transmits an API call to an Action API library to get a next available input work item or retrieve all available input work items, wherein the second action is filtered using a time range such that only a desired single snapshot backup is cloned; and populating output work items for the second action when the second action is complete.

2. The method of claim 1, further comprising:

initializing an action framework;

allocating memory for resources;

de-initialize the action framework; and freeing the allocated memory.

3. The method of claim 1, further comprising:

setting status of the input work items or the output work items for the first or second action to at least one of: running, successful, failed, cancelled, filtered, or completed.

4. The method of claim 1, further comprising:

retrieving an action detail for the input work items for the first action or the second action, wherein the action detail includes at least one of: policy name, workflow name, or action name.

5. The method of claim 1, further comprising:

retrieving an action property for the input work items for the first action or the second action, wherein the action property includes at least one of: retention, storage node, destination pool, and filter rules.

6. The method of claim 1, further comprising:

overriding the input work items for the first action or the second action with new work items for an adhoc run.

7. The method of claim 1, wherein retrieving input work items for the second action comprises retrieving input work items for the second action while performing the first action.

8. A non-transitory computer-readable storage medium having stored thereon instructions which, when executed by a processor, causes the processor to perform a method of implementing an Action API framework, the method comprising:

generating input work items from an external source for a first action included in a workflow, wherein the external source includes a list of client devices to be backed up;

populating output work items for the first action when the first action is complete;

retrieving input work items for a second action included in the workflow using the output work items for the first action;

filtering the input work items for the second action using a filter, wherein when the filter is based on a client list, the filter includes or excludes clients on the client list from the input work items for the second action, when the filter is based on a list of backup levels, the filter includes or excludes backup levels on the list of backup levels from the input work items for the second action, when the filter is based on a save set type, the filter includes input work items of the save set type for the second action, and when the filter is based on a time range, the filter includes input work items within the time range for the second action;

performing the second action using the filtered input work items, wherein the second action is a clone action that:

obtains work item inputs from the output work items for the first action, and transmits an API call to an Action API library to get a next available input work item or retrieve all available input work items, wherein the second action is filtered using a time range such that only a desired single snapshot backup is cloned; and populating output work items for the second action when the second action is complete.

9. The non-transitory computer-readable storage medium of claim 8 having stored thereon instructions which, when executed by the processor, causes the processor to perform the method further comprising:

initializing an action framework;

allocating memory for resources;

de-initialize the action framework; and freeing the allocated memory.

10. The non-transitory computer-readable storage medium of claim 8 having stored thereon instructions which, when executed by the processor, causes the processor to perform the method further comprising:

setting status of the input work items or the output work items for the first or second action to at least one of: running, successful, failed, cancelled, filtered, or completed.

11. The non-transitory computer-readable storage medium of claim 8 having stored thereon instructions which, when executed by the processor, causes the processor to perform the method further comprising:

retrieving an action detail for the input work items for the first action or the second action, wherein the action detail includes at least one of: policy name, workflow name, or action name.

12. The non-transitory computer-readable storage medium of claim 8 having stored thereon instructions which, when executed by the processor, causes the processor to perform the method further comprising:

retrieving an action property for the input work items for the first action or the second action, wherein the action property includes at least one of: retention, storage node, destination pool, and filter rules.

13. The non-transitory computer-readable storage medium of claim 8 having stored thereon instructions which, when executed by the processor, causes the processor to perform the method further comprising:

overriding the input work items for the first action or the second action with new work items for an adhoc run.

14. A storage system comprising:

a non-transitory machine-readable medium to store Action application programming interface (API) library; and a processor coupled to the non-transitory machine-readable medium, the processor configured to execute the Action API library, the Action API library is configured to generate input work items from an external source for a first action included in a workflow, wherein the external source includes a list of client devices to be backed up;

to populate output work items for the first action when the first action is complete;

to retrieve input work items for a second action included in the workflow using the output work items for the first action;

to filter the input work items for the second action using a filter, wherein when the filter is based on a client list, the filter includes or excludes clients on the client list from the input work items for the second action, when the filter is based on a list of backup levels, the filter includes or excludes backup levels on the list of backup levels from the input work items for the second action, when the filter is based on a save set type, the filter includes input work items of the save set type for the second action, and when the filter is based on a time range, the filter includes input work items within the time range for the second action;

to perform the second action using the filtered input work items, wherein the second action is a clone action that:
  obtains work item inputs from the output work items for the first action, and
  transmits an API call to an Action API library to get a next available input work item or retrieve all available input work items, wherein the second action is filtered using a time range such that only a desired single snapshot backup is cloned; and
to populate output work items for the second action when the second action is complete.

15. The storage system of claim 14, wherein the Action API library is further configured
  to initialize an action framework;
  to allocate memory for resources;
  to de-initialize the action framework; and
  to free the allocated memory.

16. The storage system of claim 14, wherein the Action API library is further configured
  to set status of the input work items or the output work items for the first or second action to at least one of: running, successful, failed, cancelled, filtered, or completed.

17. The storage system of claim 14, wherein the Action API library is further configured
  to retrieve an action detail for the input work items for the first action or the second action, wherein the action detail includes at least one of: policy name, workflow name, or action name.

18. The storage system of claim 14, wherein the Action API library is further configured
  to retrieve an action property for the input work items for the first action or the second action, wherein the action property includes at least one of: retention, storage node, destination pool, and filter rules.

19. The storage system of claim 14, wherein the Action API library is further configured
  to override the input work items for the first action or the second action with new work items for an adhoc run.

* * * * *